(12) United States Patent
Welchko et al.

(10) Patent No.: US 7,774,148 B2
(45) Date of Patent: Aug. 10, 2010

(54) TORQUE ESTIMATOR FOR IPM MOTORS

(75) Inventors: Brian A Welchko, Torrance, CA (US); Silva Hiti, Redondo Beach, CA (US); Steven E. Schulz, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 352 days.

(21) Appl. No.: 11/668,830

(22) Filed: Jan. 30, 2007

(65) Prior Publication Data
US 2008/0183405 A1 Jul. 31, 2008

(51) Int. Cl.
*G01L 1/00* (2006.01)
*H02K 21/12* (2006.01)
*H02P 23/00* (2006.01)
*G01R 1/20* (2006.01)

(52) U.S. Cl. .................... 702/41; 310/156.01; 318/727; 324/146

(58) Field of Classification Search ............ 702/41, 702/33, 44, 57, 64, 65, 127, 145, 189, 182, 702/183; 324/90, 143, 144, 146, 151 A, 324/160, 167, 177, 207.25; 310/140 R, 154.21, 310/154.42, 154.45, 156.01, 156.02, 156.05, 310/156.06, 154.47, 154.48, 156.07; 318/35, 318/689, 400.02, 727, 823, 825, 115, 118
See application file for complete search history.

(56) References Cited

U.S. PATENT DOCUMENTS 6,376,957 B1 * 4/2002 Haydock et al. ............ 310/155
6,392,418 B1 * 5/2002 Mir et al. .................... 324/503
6,525,504 B1 * 2/2003 Nygren et al. .............. 318/700
6,803,692 B2 * 10/2004 Hattori et al. ........... 310/156.53
6,910,389 B2 * 6/2005 Ho ......................... 73/862.193
7,042,227 B2 * 5/2006 Mir et al. .................... 324/503
2007/0216249 A1 * 9/2007 Gruendel et al. ....... 310/156.02

OTHER PUBLICATIONS

Jeong et al., On-Line Minimum-Copper-Loss Control of an Interior Permanent-Magnet Synchronous Machine for Automotive Applications, 2005 IEEE, pp. 943-949.*
Krishman et al., Fast Estimation and Compensation of Rotor Flux Linkage in Permanent Magnet Synchronous Machines, 1999 IEEE, pp. 661-666.*
Rahman et al., Identification of Machine Parameters of a Synchronous Motor, Mar./Apr. 2005, IEEE Transactions on Industry Applications, vol. 41, No. 2, pp. 557-565.*

(Continued)

*Primary Examiner*—Michael P. Nghiem
*Assistant Examiner*—Toan M Le
(74) *Attorney, Agent, or Firm*—Ingrassia Fisher & Lorenz, P.C.

(57) ABSTRACT

In an embodiment of a method, the method includes measuring currents and voltages that are coupled to a motor that includes an internal permanent magnet and determining a reactive power in response to the measured currents and voltages. The method further includes estimating a first flux orthogonal to an axis of the internal permanent motor and estimating a second flux aligned with the axis of the internal permanent motor. Additionally, the method includes estimating a torque in response to the measured currents and the first and second fluxes.

18 Claims, 3 Drawing Sheets

OTHER PUBLICATIONS

Senjyu et al., Vector Control of PMSM with On-Line Parameter Measurement Including Stator Iron Loss, 1996 IEEE, pp. 1717-1722.*

Krishman et al., Parameter Compensation of Permanent Magnet Synchronous Machines Through Airgap Power Feedback, 1995 IEEE, pp. 411-416.*

Jansen et al., A Physically Insightful Approach to the Design and Accuracy Assessment of Flux Observers for Field Oriented Induction Machine Drives, Jan./Feb. 1994, IEEE Transactions on Industry Applications, vol. 30, No. 1, pp. 101-110.*

Jansen, P.L. et al., "A Physically Insightful Approach to the Design and Accuracy Assessment of Flux Observers for Field Oriented Induction Machines Drives," IEEE Transactions on Industry Applications, Jan./Feb. 1994, pp. 101-110, vol. 30, No. 1.

Krishan, R. et al., "Parameter Compensation of Permanent Magnet Synchronous Machines Through Airgap Power Feedback," IEEE Proceedings of the IECON, Nov. 1995, pp. 411-416, vol. 1.

Krishan, R. et al., "Fast Estimation and Compensation of Rotor Flux Linkage in Permanent Magnet Synchronous Machines," 1999, Proceedings of the IEEE International Symposium on Industrial Electronics, pp. 661-666, vol. 2.

Senjyu,T. et al., "Vector Control of PMSM With On-Line Parameter Measurement Including Stator Iron Loss," IEEE - Proceedings of the IECON, 1996, pp. 1717-1722, vol. 3.

Peng, F.Z. et al., "Generalized Instantaneous Reactive Power Theory for Three-Phase Power Systems," IEEE Transactions on Instrumentation and Measurement, Feb. 1996, pp. 293-297, vol. 4, No. 1.

* cited by examiner

TORQUE ESTIMATOR FOR IPM MOTORS

BACKGROUND OF THE INVENTION

Description of Related Art

Flux and torque estimation in electric motors is fundamental to properly control the output torque which is produced. All of the known published torque estimators for IPM motors assume knowledge of the motor inductances and magnet flux. Since the magnet flux changes with temperature and the d-axis inductance changes with magnet flux, a poor estimate may result.

Flux estimators can be broadly classified into current based models or voltage based models. For example, see P. L. Jansen, and R. D. Lorenz, "A physically insightful approach to the design and accuracy assessment of flux observers for field oriented induction motor drives," *IEEE. Trans. Industry Applications*, vol. 30, no. 1, pp. 101-110, January/February 1994. Current based models are open-loop in nature and sensitive to inductance and permanent magnet flux uncertainties. Voltage based models are closed loop in nature and are sensitive to parameter uncertainties in resistance. When flux observers are formulated for interior permanent magnet (IPM) machines, they are often based on airgap power feedback which is a voltage based model. For example, see R. Krishnan, and P. Vijayraghavan, "Parameter compensation of permanent magnet synchronous machines through airgap power feedback," in *Proc. IEEE IECON*, 1995, vol. 1, pp. 411-416. In general, voltage based models are typically used at higher speeds, while current based models are generally used at lower speeds. The two methods can be combined in numerous ways so that an estimate exists across the entire speed range.

An alternative approach incorporates a current and voltage based model with reactive power feedback. For an example, see R. Krishnan, and P. Vijayraghavan, "Fast estimation and compensation of rotor flux linkage in permanent magnet synchronous machines," in *Proc. IEEE International Symposium on Industrial Electronics*, 1999, vol. 2, pp. 661-666.

Torque estimators may advantageously be used in a vehicle traction drive system. In FIG. 1, a known traction drive system includes PWM inverter 2 (pulse width modulator inverter 2) that drives multi-phase AC motor 6 over lines 4. The number of connections represented by lines 4 is defined by the number of phases used in AC motor 6. For example, a three phase AC motor would have three lines 4. In lines 4, there is located current and voltage sensors 8. The number of current sensors and voltage sensors in current and voltage sensors 8 is again defined by the number of phases used in AC motor 6. The outputs of current and voltage sensors 8 are coupled to transformation processor 12 over lines 10. The number of connections represented by lines 10 is again defined by the number of phases used in AC motor 6, in this example, three for voltages and three for currents.

In the example of a three phase system, the three phase currents ($i_{as}$, $i_{bs}$ and $i_{cs}$) that are measured by current sensors 8 typically carry sinusoidal current waveforms when viewed in a stationary frame referenced to the stator of the AC motor and this reference frame is referred to as the stationary frame. In transformation processor 12, these three phase currents are transformed into a synchronous frame referenced to the rotor of the AC motor and this reference frame is referred to as the synchronous frame (i.e., synchronous with the rotor). The currents applied to windings of the motor might be viewed in combination as a current vector. In the stationary frame, the current vector would rotate with the rotor. In the synchronous frame, the current vector is typically non-rotating when the motor is in a steady state of operation. It is therefore convenient, but not necessary, to represent the current vector in the synchronous frame in Cartesian coordinates d-q where the axis d is conveniently chosen to represent a direction aligned with the magnet flux in the internal permanent magnet IPM, and the axis q is conveniently chosen to represent a direction orthogonal to the magnet flux in the IPM. The current vector expressed in the d-q coordinate system will, in general, be either slowly varying or constant. The components of the current vector in the d-q coordinate system of the synchronous frame are computed from three current measurement in the stationary frame using equation 1 as follows:

$$\begin{bmatrix} i_d^r \\ i_q^r \end{bmatrix} = T(\theta_r) \begin{bmatrix} i_a \\ i_b \\ i_c \end{bmatrix} \qquad (1)$$

$$= \frac{2}{3} \begin{bmatrix} \cos(\theta_r) & \cos\left(\theta_r - \frac{2}{3}\pi\right) & \cos\left(\theta_r + \frac{2}{3}\pi\right) \\ \sin(\theta_r) & \sin\left(\theta_r - \frac{2}{3}\pi\right) & \sin\left(\theta_r + \frac{2}{3}\pi\right) \end{bmatrix} \begin{bmatrix} i_a \\ i_b \\ i_c \end{bmatrix}$$

where the rotor angle $\theta r$ is the electrical rotor position calculated from the mechanical rotor position and motor pole number. Rotor angle $\theta_r$ is measured by a sensor (not shown). The d-q frame of reference, referred to as Cartesian coordinates, is synchronous with the rotation of the mechanical rotor position. The subscripts a, b and c represent the current measurement in the phase a, b, and c. The superscript r represents the current data calculated to be in the synchronous frame (rotating in synchronism with the rotor). The subscripts d and q represent the current data calculated to be along the d-axis and the q-axis, respectively.

The outputs of transformation processor 12 are the measured d-q currents ($i_d^r$ and $i_q^r$) as depicted in FIG. 1 by 14 and 16. The measured d-q currents ($i_d^r$ and $i_q^r$) are coupled to processor 100. An analogous process is used to provide measured voltages expressed in the synchronous frame in Cartesian coordinates to processor 100.

Processor 100 performs a variety of functions including flux and torque estimations.

Signals processed through processor 100 are referenced in d-q coordinates to the synchronous frame. For example, estimated command voltages are processed through processor 100 and are referenced in d-q coordinates to the synchronous frame. The processed signals are reconverted into a stationary reference frame, still in Cartesian coordinates, in de-rotation processor 46.

Actual voltage commands ($V_{d\_out}^{r*}$ and $V_{q\_out}^{r*}$) generated in processor 100 that are output from processor 100 are coupled to de-rotation processor 46 to transform the voltage commands in d-q coordinates in a synchronous (i.e., rotating) frame into voltage commands, still in d-q coordinates, but in a stationary frame (i.e., referenced to the stator) in which the command voltages rotate as follows.

$$\begin{bmatrix} v_{d\_out}^{s*} \\ v_{q\_out}^{s*} \end{bmatrix} = R(\theta_r) \begin{bmatrix} v_{d\_out}^{r*} \\ v_{q\_out}^{r*} \end{bmatrix} \qquad (2)$$

$$= \begin{bmatrix} \cos(\theta_r) & -\sin(\theta_r) \\ \sin(\theta_r) & \cos(\theta_r) \end{bmatrix} \begin{bmatrix} v_{d\_out}^{r*} \\ v_{q\_out}^{r*} \end{bmatrix}$$

The d and q outputs from de-rotation processor 46 are coupled to a further processor 48 for further processing. The de-rotated voltage command ($V_{d\_out}^{s*}$ and $V_{q\_out}^{s*}$), that now rotates in the stationary frame of reference, is processed by the further processor 48.

The outputs of further processor 48 are coupled to inverse transformation processor 50. In the three phase example described herein, inverse transformation processor 50 converts a stationary frame representation of a rotating voltage command from the further processor 48 into a three phase sinusoid notation of the voltage command as follows.

$$\begin{bmatrix} v_a^* \\ v_b^* \\ v_c^* \end{bmatrix} = T(\theta_r)^{-1} \begin{bmatrix} v_{d\_out}^{s*} \\ v_{q\_out}^{s*} \end{bmatrix} \qquad (3)$$

$$= \begin{bmatrix} 1 & 0 \\ -\frac{1}{2} & \frac{\sqrt{3}}{2} \\ -\frac{1}{2} & \frac{\sqrt{3}}{2} \end{bmatrix} \begin{bmatrix} v_{d\_out}^{s*} \\ v_{q\_out}^{s*} \end{bmatrix}$$

The outputs of inverse transformation processor 50 is coupled to PWM inverter 2 to control AC motor 2.

SUMMARY OF THE INVENTION

In an embodiment of a method, the method includes measuring (using either physical sensors or virtual software replacements) currents and voltages that are coupled to a motor that includes an internal permanent magnet and determining a reactive power in response to the measured currents and voltages. The method further includes estimating a first flux orthogonal to an axis of the internal permanent motor and estimating a second flux aligned with the axis of the internal permanent motor. Additionally, the method includes estimating a torque in response to the measured currents and the first and second fluxes.

In an embodiment of a torque estimator, the torque estimator includes an input, a memory, and a processor. The processor is operable with the memory to input measured currents and voltages that are coupled to a motor that includes an internal permanent magnet and to determine a reactive power in response to the measured currents and voltages. The processor is further operable with the memory to estimate a first flux orthogonal to an axis of the internal permanent motor and to estimate a second flux aligned with the axis of the internal permanent motor. The processor is additionally operable with the memory to estimate a torque in response to the measured currents and the first and second fluxes.

In an embodiment of a machine-readable medium, the machine-readable medium includes sets of instructions operable in a machine that includes a processor and an input. A first collection of the sets of instructions is operable to cause the processor to perform operations that include measuring currents and voltages that are coupled to a motor that includes an internal permanent magnet, and determining a reactive power in response to the measured currents and voltages. The first collection is also operable to cause the processor to perform further operations that include estimating a first flux orthogonal to an axis of the internal permanent motor, and estimating a second flux aligned with the axis of the internal permanent motor. The first collection is also operable to cause the processor to perform additional operations that include estimating a torque in response to the measured currents and the first and second fluxes.

BRIEF DESCRIPTION OF THE DRAWINGS

The invention will be described in detail in the following description of preferred embodiments with reference to the following figures.

DETAILED DESCRIPTION OF PREFERRED EMBODIMENTS

Figure 1:
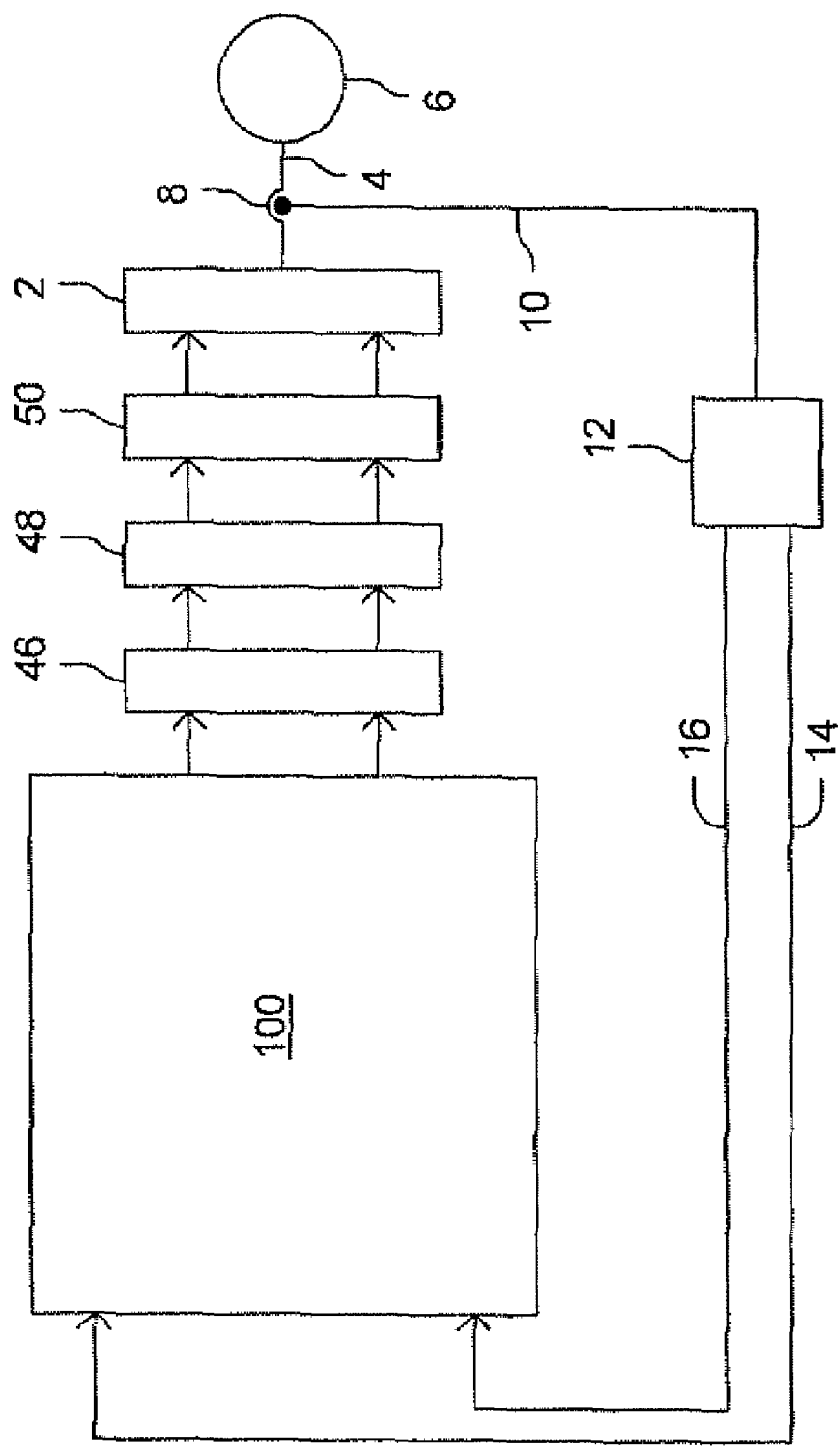
FIG. 1 is a generalized functional block diagram of a known traction drive system.

A drawback to the current and voltage based torque estimator model with reactive power feedback is that it relied on implicit knowledge of a constant permanent magnet flux linkage. The present inventors have discovered that for high performance applications which are subjected to wide operating temperature conditions, the permanent magnet flux linkage cannot be considered to be constant. In addition, iron losses are typically not accounted for in flux estimators even though they can significantly reduce the torque output of the motor. For example, see T. Senjyu, T. Shimabukuro, N. Urasaki, and K. Uezato, "Vector control of PMSM with on-line parameter measurement including stator iron loss," in *Proc. IEEE IECON*, 1996, vol. 3, pp. 1717-1722.

An improved flux and torque estimator is based on reactive power which is insensitive to iron losses and does not assume known constant values of permanent magnet flux. The improved estimator is configured around the most stable system term, the q-axis flux, so that a more accurate estimate results. The q-axis flux is the flux orthogonal to the direction of the internal permanent magnet IPM in the rotor. Using an assumed known q-axis flux and building an estimator around the measured reactive power is unknown in the electrical engineering literature.

A model of an IPM motor in the synchronous reference frame is given as:

$$v_q^r = (r_s + r_{fe})i_q^r + \frac{d}{dt}\lambda_q^r + \omega_e \lambda_d^r \qquad (4)$$

$$v_d^r = (r_s + r_{fe})i_d^r + \frac{d}{dt}\lambda_d^r - \omega_e \lambda_q^r \qquad (5)$$

Where $r_{fe}$ approximates the iron loss resistance term. The synchronous fluxes are given as $$\lambda_q^r = L_q i_q^r \qquad (6)$$

$$\lambda_d^r = L_d i_d^r + \Psi_{mag} \qquad (7)$$

and the electromagnetic torque is given as $$T = \frac{3}{2}P(\lambda_d^r i_q^r - \lambda_q^r i_d^r) \qquad (8)$$

where P is the number of pole-pairs.

A benefit of basing a flux estimator around reactive power is that the reactive power is completely independent of any resistive type losses since the active and reactive powers are in quadrature. Thus the reactive power can be calculated based on measured terminal properties or commanded inverter duty cycles since inverter losses are resistive losses in nature.

From stationary frame quantities (i.e., quantities measured with respect to the stator), the reactive power is given as:

$$q = \|q_{abc}\| = \sqrt{q_a^2 + q_b^2 + q_c^2} \qquad (9)$$

where the phase reactive powers are given as $$q_{abc} = \begin{bmatrix} q_a \\ q_b \\ q_c \end{bmatrix} \qquad (10)$$

$$= \begin{bmatrix} \left| \begin{matrix} v_b & v_c \\ i_b & i_c \end{matrix} \right| \\ \left| \begin{matrix} v_c & v_a \\ i_c & i_a \end{matrix} \right| \\ \left| \begin{matrix} v_a & v_b \\ i_a & i_b \end{matrix} \right| \end{bmatrix}.$$

In the synchronous reference frame (i.e., quantities measured with respect to the rotor), the reactive power is given as $$q = \frac{3}{2}(v_q^r i_d^r - v_d^r i_q^r). \qquad (11)$$

Equations (9) and (10) provide a method to compute the actual reactive power in the system when the voltage and current measurements are referenced to the stationary frame. Equation (11) provides a method to compute the actual reactive power in the system when the voltage and current measurements are referenced to the synchronous frame. For the objective of flux estimation and when the measured voltages and currents are expressed in the synchronous frame in Cartesian coordinates, the reactive power can also be determined from $$q = \frac{3}{2}\omega_e(\lambda_q^r i_q^r + \lambda_d^r i_d^r). \qquad (12)$$

Equation (12) represents an underdetermined system since it contains two unknowns (q-axis and d-axis fluxes) but only one equation. It is assumed that the value of the reactive power, q, in (12) is known and determined using either equations (9) and (10) or equation (11) or other mathematical equivalents.

Considering the composition of the fluxes given by equations (6) and (7), the q-axis flux represents an opportunity for a second equation to make the system uniquely solvable. Since the magnet flux varies with temperature and d-axis inductance is strongly influenced by the localized saturation of the rotor bridges, the d-axis flux can vary widely over the operating range of the system. On the contrary, the q-axis flux is composed of an inductance term which is affected primarily by the rotor geometry. The q-axis inductance is subject to saturation and cross-saturation with the d-axis current, but is typically only minimally affected by changes in the magnet flux. As a result, the q-axis flux can be characterized and considered a known independent quantity of magnet flux temperature. The estimated q-axis flux can then be written as a function of the q-axis and d-axis currents, and/or a nominal temperature as $$\hat{\lambda}_q^r = f(i_q^r, i_d^r, \text{temp}_{nom}) \qquad (13)$$

Using equation (13) for the estimate of the q-axis flux and solving for the d-axis flux using equation (12) gives the estimated d-axis flux linkage as $$\hat{\lambda}_d^r = \frac{1}{i_d^r}\left(\frac{2}{3}\frac{q}{\omega_e} - \hat{\lambda}_q^r i_q^r\right). \qquad (14)$$

The estimated d-axis flux linkage given by (14) shows that the method will become unreliable for both low speeds and/or low values of d-axis current. Under these conditions, a different flux estimator must be used. The estimated torque can then be found as $$\hat{T} = \frac{3}{2}P(\hat{\lambda}_d^r i_q^r - \hat{\lambda}_q^r i_d^r). \qquad (15)$$

Equation (15) represents the proposed estimate of the motor torque based on reactive power and a pre-characterized q-axis flux linkage.

Figure 2:
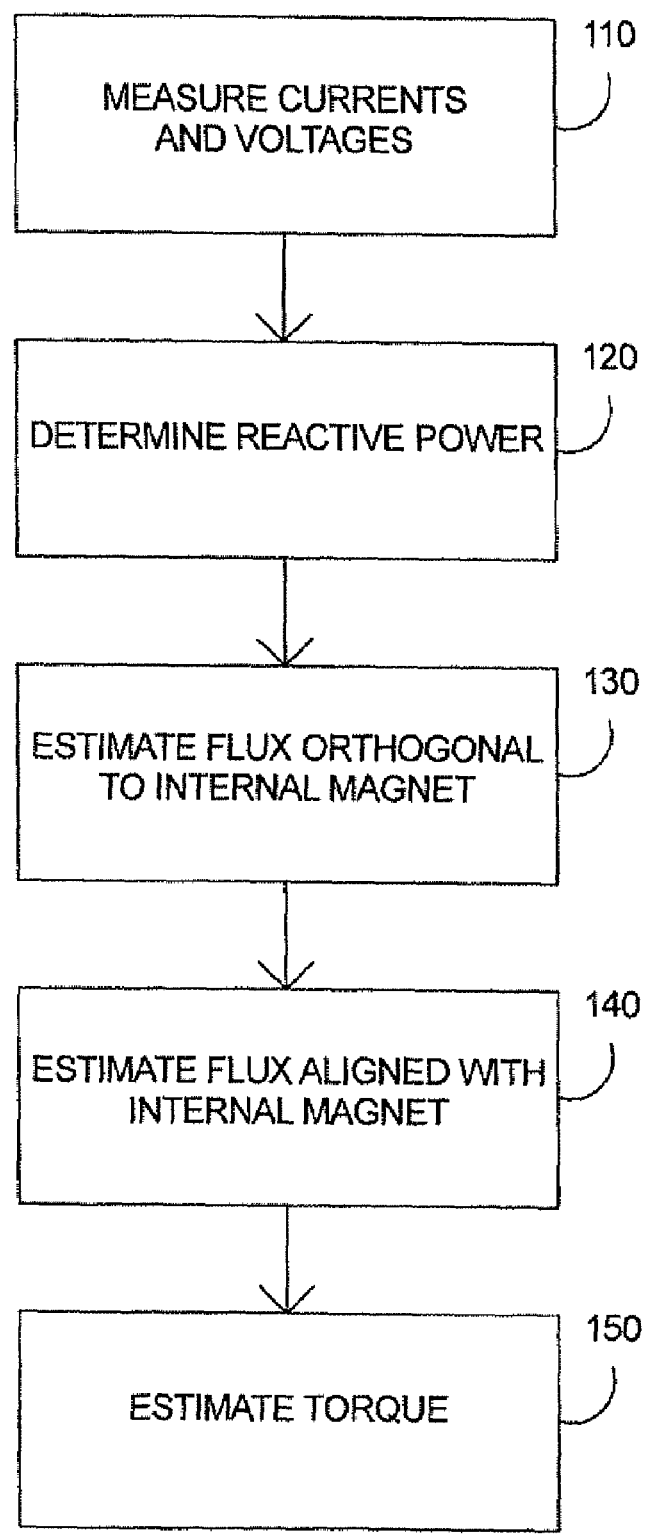
FIG. 2 is a flow chart of a method of estimating torque.

Referring to FIG. 2, an embodiment of a method includes measuring at 110 currents and voltages that are coupled to a motor (6, FIG. 1) that includes an internal permanent magnet and determining at 120 a reactive power in response to the measured currents and voltages. The method further includes estimating at 130 a first flux orthogonal to an axis of the internal permanent motor and estimating at 140 a second flux aligned with the axis of the internal permanent motor. Additionally, the method includes estimating at 150 a torque in response to the measured currents and the first and second fluxes.

In an example of the embodiment of the method, the determining at 120 of a reactive power computes the reactive power in response to measured currents and voltages expressed in the stationary frame as discussed above with respect to equations (9) and (10).

In a second example of the embodiment of the method, the determining at 120 of a reactive power computes the reactive power as discussed above with respect to equation (11) according to $$q = \frac{3}{2}(v_q^r i_d^r - v_d^r i_q^r)$$

where q is the determined reactive power, $v_q^r$ and $v_d^r$ together constitute the measured voltages in Cartesian coordinates expressed in a synchronous frame, and $i_q^r$ and $i_d^r$ together constitute the measured currents in Cartesian coordinates expressed in the synchronous frame.

In a third example of the embodiment of the method, the estimating at 130 of the first flux defines the first flux estimate as a predetermined flux selected in response to the measured currents. The first flux orthogonal to an axis of the internal permanent motor of each individual motor is very closely characterized by the measured currents in Cartesian coordinates expressed in the synchronous frame, $i_q^r$ and $i_d^r$. In one version, a function that is dependent on the measured currents is defined by regression or other means. Then, the first flux is calculated according to that function. In another version, the range of allowable current for each of the measured currents may be divided into a predetermined number of bins. Then, each actual measured current is placed in an individual bin, and that placement becomes an index into a table. The two dimensional index corresponding to the measured currents is then used to look up the first flux in a table. Other equivalent means may be used. Alternatively, a three dimensional index which includes some nominal temperature input may be used.

In a fourth example of the embodiment of the method, the measuring at 110 also measures a rotation speed, and the estimating at 140 of the second flux includes computing the second flux in response to the reactive power, the measured currents, the rotation speed and the first flux estimate.

In one version of the fourth example of the embodiment of the method the computing of the second flux calculates $$\hat{\lambda}_d^r = \frac{1}{i_d^r}\left(\frac{2}{3}\frac{q}{\omega_r} - \hat{\lambda}_q^r i_q^r\right),$$

where $\hat{\lambda}_d^r$ is the estimated second flux, q is the determined reactive power, $i_q^r$ and $i_d^r$ together constitute the currents in Cartesian coordinates expressed in the synchronous frame, and $\omega_r$ is the measured rotation speed.

In a fifth example of the embodiment of the method, the motor (6, FIG. 1) defines a predetermined number of pole pairs, and the estimated torque is calculated as $$\hat{T} = \frac{3}{2}P(\hat{\lambda}_d^r i_q^r - \hat{\lambda}_q^r i_d^r),$$

where $\hat{T}$ is the estimated torque, P is the predetermined number of pole pairs, $\hat{\lambda}_q^r$ and $\hat{\lambda}_d^r$ are the estimated first and second fluxes, respectively, and $i_q^r$ and $i_d^r$ together constitute the measured currents in Cartesian coordinates expressed in the synchronous frame.

Figure 3:
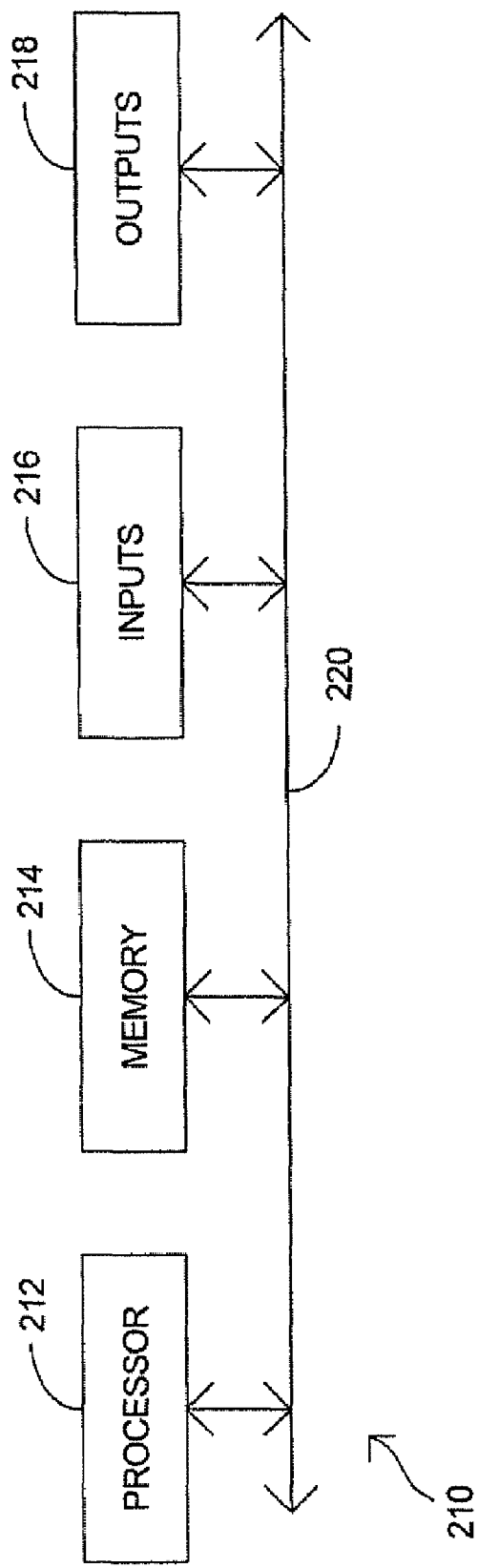
FIG. 3 is a block diagram of a system to perform the method depicted in FIG. 2.

The methods described herein are most often implemented in a general purpose computer, often the torque estimator is just a portion of processor 100 of FIG. 1. Typically, such a processor is depicted as system 210 in FIG. 3. System 210 includes a bus 220 to facilitate communications between processor 212, memory 214, input circuit 216 and output circuit 218. Such a system can be implemented in a printed wiring assembly (PWA) with major components assembled on the PWA. Depending on the specific programming requirements and the speed of the processor, system 210 might be implemented in a single integrated circuit or a couple of related integrated circuits. Other implementations might include application specific integrated circuits ASICs or field programmable gate arrays FPGAs.

In any event, the torque estimator includes an input 216 for receiving measured data from sensors, a memory 214 for holding processor instructions and data including the ultimate estimate of the torque, and a processor 212 operable with the memory to perform may of the operations of the torque estimator. These operations include inputting measured currents and voltages that are coupled to a motor that includes an internal permanent magnet, determining a reactive power in response to the measured currents and voltages, estimating a first flux orthogonal to an axis of the internal permanent motor, estimating a second flux aligned with the axis of the internal permanent motor, and estimating a torque in response to the measured currents and the first and second fluxes. Memory 214 may be divided into a volatile memory such as a DRAM or static RAM and into a non-volatile memory, typically any machine-readable memory, such as a ROM, a PROM, a flash memory, a CD ROM, a DVD, a floppy disk or any magnetic or electrostatic storage memory.

Having described preferred embodiments of a novel torque estimator (which are intended to be illustrative and not limiting), it is noted that modifications and variations can be made by persons skilled in the art in light of the above teachings. It is therefore to be understood that changes may be made in the particular embodiments of the invention disclosed which are within the scope of the invention as defined by the appended claims.

Having thus described the invention with the details and particularity required by the patent laws, what is claimed and desired protected by Letters Patent is set forth in the appended claims.

What is claimed is:

1. A method for estimating torque in a motor comprising an internal permanent magnet coupled to a system controller, the method comprising:
   determining, via a processor, currents and voltages coupled to the motor;
   determining, via the processor, a rotation speed for the motor;
   determining, via the processor, a reactive power for the motor based on the currents and the voltages;
   estimating, via the processor, a first flux orthogonal to an axis of the internal permanent magnet motor based on the currents;
   estimating, via the processor, a second flux aligned with the axis of the internal permanent magnet motor based on the currents, the rotation speed, the reactive power, and the first flux;
   estimating, via the processor, a torque for the motor based on the currents, the first flux, and the second flux; and
   indicating the estimated torque to the system controller.

2. A method according to claim 1, wherein the determining computes the reactive power in response to measured currents and voltages expressed in the stationary frame.

3. A method according to claim 1, wherein the determining computes the reactive power according to $$q = \frac{3}{2}(v_q^r i_d^r - v_d^r i_q^r)$$

wherein q is the determined reactive power,
wherein $v_q^r$ and $v_d^r$ together constitute the measured voltages in Cartesian coordinates expressed in a synchronous frame, and
wherein $i_q^r$ and $i_d^r$ together constitute the measured currents in Cartesian coordinates expressed in the synchronous frame.

4. A method according to claim 1, wherein the estimating of the first flux defines the first flux estimate as a predetermined flux selected in response to the measured currents.

5. A method according to claim 1, wherein the computing of the second flux calculates $$\hat{\lambda}_d^r = \frac{1}{i_d^r}\left(\frac{2}{3}\frac{q}{\omega_r} - \hat{\lambda}_q^r i_q^r\right),$$

wherein $\hat{\lambda}_q^r$ is the estimated first flux,
wherein $\hat{\lambda}_d^r$ is the estimated second flux,
wherein q is the determined reactive power, wherein $i_q^r$ and $i_d^r$ together constitute the currents in Cartesian coordinates expressed in the synchronous frame, and wherein $\omega_r$ is the measured rotation speed.

6. A method according to claim 1, wherein:

the motor defines a predetermined number of pole pairs; and the estimated torque is calculated as $$\hat{T} = \frac{3}{2} P (\hat{\lambda}_d^r i_q^r - \hat{\lambda}_q^r i_d^r),$$

wherein $\hat{T}$ is the estimated torque, wherein P is the predetermined number of pole pairs, wherein $\hat{\lambda}_q^r$ and $\hat{\lambda}_d^r$ are the estimated first and second fluxes respectively, and wherein $i_q^r$ and $i_d^r$ together constitute the measured currents in Cartesian coordinates expressed in the synchronous frame.

7. A torque estimator configured to be coupled to a system controller, the torque estimator comprising:

an input;

a memory; and a processor operable with the memory to:

input currents and voltages that are coupled to a motor that includes an internal permanent magnet, determine a rotation speed for the motor, determine a reactive power for the motor based on the currents and the voltages, estimate a first flux orthogonal to an axis of the internal permanent magnet motor based on the currents, estimate a second flux aligned with the axis of the internal permanent magnet motor based on the currents, the rotation speed, the reactive power, and the first flux, estimate a torque for the motor based on the currents, the first flux, and the second flux; and indicate the estimated torque to the system controller.

8. A torque estimator according to claim 7, wherein the processor operable with the memory to determine the reactive power is operable to compute the reactive power in response to measured currents and voltages expressed in the stationary frame.

9. A torque estimator according to claim 7, wherein the processor operable with the memory to determine the reactive power is operable to compute the reactive power according to $$q = \frac{3}{2} (v_q^r i_d^r - v_d^r i_q^r)$$

wherein q is the determined reactive power, wherein $v_q^r$ and $v_d^r$ together constitute the measured voltages in Cartesian coordinates in a synchronous frame, and wherein $i_q^r$ and $i_d^r$ together constitute the measured currents in Cartesian coordinates in the synchronous frame.

10. A torque estimator according to claim 7, wherein the processor operable with the memory to estimate the first flux defines the first flux estimate as a predetermined flux selected in response to the measured currents.

11. A torque estimator according to claim 7, wherein the processor operable with the memory to compute the second flux is operable to calculate $$\hat{\lambda}_d^r = \frac{1}{i_d^r} \left( \frac{2}{3} \frac{q}{\omega_r} - \hat{\lambda}_q^r i_q^r \right),$$

wherein $\hat{\lambda}_q^r$ is the estimated first flux, wherein $\hat{\lambda}_d^r$ is the estimated second flux, wherein q is the determined reactive power, wherein $i_q^r$ and $i_d^r$ together constitute the currents in Cartesian coordinates expressed in the synchronous frame, and wherein $\omega_r$ is the measured rotation speed.

12. A torque estimator according to claim 7, wherein:

the motor defines a predetermined number of pole pairs; and the processor operable with the memory to estimate a torque is operable to calculate $$\hat{T} = \frac{3}{2} P (\hat{\lambda}_d^r i_q^r - \hat{\lambda}_q^r i_d^r),$$

wherein $\hat{T}$ is the estimated torque, wherein P is the number of pole pairs, wherein $\hat{\lambda}_q^r$ and $\hat{\lambda}_d^r$ are the estimated first and second fluxes respectively, and wherein $i_q^r$ and $i_d^r$ together constitute the measured currents in Cartesian coordinates expressed in the synchronous frame.

13. A non-transitory machine-readable medium comprising instructions that, when executed by a processor, cause the processor to perform a method for estimating torque in a motor coupled to a system controller comprising:

determining currents and voltages that are coupled to the motor that includes an internal permanent magnet;

determining a rotation speed for the motor;

determining a reactive power based on the currents and the voltages;

estimating a first flux orthogonal to an axis of the internal permanent magnet motor based on the reactive power;

estimating a second flux aligned with the axis of the internal permanent magnet motor based on the currents, the rotation speed, the reactive power, and the first flux;

estimating a torque based on the currents, the first flux, and the second flux; and indicating the estimated torque to the system controller.

14. A non-transitory machine-readable medium according to claim 13, wherein the determining computes the reactive power in response to measured currents and voltages expressed in the stationary frame.

15. A non-transitory machine-readable medium according to claim 13, wherein the determining computes the reactive power according to $$q = \frac{3}{2} (v_q^r i_d^r - v_d^r i_q^r)$$

wherein q is the determined reactive power, wherein $v_q^r$ and $v_d^r$ together constitute the measured voltages in Cartesian coordinates expressed in a synchronous frame, and wherein $i_q^r$ and $i_d^r$ together constitute the measured currents in Cartesian coordinates expressed in the synchronous frame.

16. A non-transitory machine-readable medium according to claim 13, wherein the estimating of the first flux defines the first flux estimate as a predetermined flux selected in response to the measured currents.

17. A non-transitory machine-readable medium according to claim 13, wherein the computing of the second flux calculates $$\hat{\lambda}_d^r = \frac{1}{i_d^r}\left(\frac{2}{3}\frac{q}{\omega_r} - \hat{\lambda}_q^r i_q^r\right),$$

wherein $\hat{\lambda}_q^r$ is the estimated first flux,
wherein $\hat{\lambda}_d^r$ is the estimated second flux,
wherein q is the determined reactive power,
wherein $i_q^r$ and $i_d^r$ together constitute the currents in Cartesian coordinates expressed in the synchronous frame, and
wherein $\omega_r$ is the measured rotation speed.

18. A non-transitory machine-readable medium according to claim 13, wherein:
the motor defines a predetermined number of pole pairs; and
the estimated torque is calculated as $$\hat{T} = \frac{3}{2}P(\hat{\lambda}_d^r i_q^r - \hat{\lambda}_q^r i_d^r),$$

wherein $\hat{T}$ is the estimated torque,
wherein P is the predetermined number of pole pairs,
wherein $\hat{\lambda}_q^r$ and $\hat{\lambda}_d^r$ are the estimated first and second fluxes respectively, and
wherein $i_q^r$ and $i_d^r$ together constitute the measured currents in Cartesian coordinates expressed in the synchronous frame.

* * * * *